(12) United States Patent
Schott et al.

(10) Patent No.: US 12,139,135 B2
(45) Date of Patent: Nov. 12, 2024

(54) METHOD FOR IDENTIFYING AN OBSTACLE

(71) Applicant: DEERE & COMPANY, Moline, IL (US)

(72) Inventors: Florian Schott, Einhausen (DE); Martin Schmidt, Contwig (DE)

(73) Assignee: DEERE & COMPANY, Moline, IL (US)

( * ) Notice: Subject to any disclaimer, the term of this patent is extended or adjusted under 35 U.S.C. 154(b) by 223 days.

(21) Appl. No.: 16/946,819

(22) Filed: Jul. 8, 2020

(65) Prior Publication Data

US 2021/0024062 A1 Jan. 28, 2021

(30) Foreign Application Priority Data

Jul. 22, 2019 (DE) .......................... 102019210839.3

(51) Int. Cl.
| | |
|---|---|
| *B60W 30/095* | (2012.01) |
| *B60W 30/09* | (2012.01) |
| *B60W 30/18* | (2012.01) |
| *B60W 50/14* | (2020.01) |
| *B62D 21/02* | (2006.01) |
| *B62D 33/06* | (2006.01) |
| *G01S 7/48* | (2006.01) |
| *G01S 17/931* | (2020.01) |

(52) U.S. Cl.
CPC .......... *B60W 30/095* (2013.01); *B60W 30/09* (2013.01); *B60W 30/18009* (2013.01); *B60W 50/14* (2013.01); *B62D 21/02* (2013.01); *B62D 33/06* (2013.01); *B60W 2420/408* (2024.01); *B60W 2554/40* (2020.02); *B60W 2554/80* (2020.02); *G01S 7/4802* (2013.01); *G01S 17/931* (2020.01)

(58) Field of Classification Search
CPC ............... B60W 30/095; B60W 30/09; B60W 30/18009; B60W 50/14; B60W 2554/80; B60W 2554/40; B60W 2420/52; B62D 21/02; B62D 33/06; G01S 17/931; G01S 7/4802

See application file for complete search history.

(56) References Cited

U.S. PATENT DOCUMENTS

| | | | |
|---|---|---|---|
| 7,164,118 B2 | 1/2007 | Anderson et al. | |
| 9,265,187 B2 * | 2/2016 | Cavender-Bares | ........ B25J 5/00 |
| 2010/0013615 A1 | 1/2010 | Hebert et al. | |
| 2010/0063672 A1 | 3/2010 | Anderson | |
| 2011/0288714 A1 * | 11/2011 | Flohr | ........................ G05D 1/02 |
| | | | 701/27 |

(Continued)

OTHER PUBLICATIONS

European Search Report issued in counterpart application No. 20185495.7 dated Nov. 25, 2020 (09 pages).

*Primary Examiner* — Mahmoud S Ismail
*Assistant Examiner* — Gabriel Anfinrud
(74) *Attorney, Agent, or Firm* — Taft Stettinius & Hollister LLP; Stephen F. Rost

(57) ABSTRACT

A method is provided for identifying an obstacle during a work operation of a tractor and attached implement combination. The method includes detecting an object during the work operation, and identifying the detected object as an obstacle in dependence on the predefined classification parameter for classification of the detected object or a predefined work parameter of the tractor or the implement.

17 Claims, 2 Drawing Sheets

(56) References Cited

U.S. PATENT DOCUMENTS

| | | |
|---|---|---|
| 2017/0131722 A1 | 5/2017 | Hiramatsu et al. |
| 2017/0139418 A1* | 5/2017 | Hiramatsu ............ A01B 69/008 |
| 2018/0084708 A1* | 3/2018 | Neitemeier .......... A01B 69/001 |
| 2019/0079526 A1* | 3/2019 | Vallespi-Gonzalez ...................... G01S 7/417 |
| 2023/0210039 A1* | 7/2023 | Pell ...................... G05D 1/0214 701/28 |

* cited by examiner

METHOD FOR IDENTIFYING AN OBSTACLE

RELATED APPLICATIONS

This application claims priority to German Patent Application Ser. No. 102019210839.3, filed Jul. 22, 2019, the disclosure of which is hereby incorporated by reference in its entirety.

FIELD OF THE DISCLOSURE

The present disclosure relates to a method for identifying an obstacle during a work operation of a tractor/attached implement combination.

BACKGROUND

When work is being performed on work areas, especially on arable land, stones or other objects on the surface of the work area can interfere with the work operation. The interfering objects can adversely affect the attached implement or the tractor. In addition, the work result can be impaired by the interfering objects.

It is therefore desirable to reduce interference during the work operation of a tractor/attached implement combination.

SUMMARY

In the present disclosure, a method is provided to identify an obstacle during a work operation of a tractor/attached implement combination. In this case, objects are detected because they could potentially interfere with the work operation. A detected object is identified as an actually interfering obstacle in dependence on at least one of the following variables:
 (1) a predefined classification parameter for classification of the detected object, and
 (2) a predefined work parameter of the tractor or of the attached implement.

Consideration of at least one of the above parameters helps to ensure that, during the work operation of the tractor/attached implement combination, stones and other objects are identified as obstacles in good time, and can therefore either be removed or avoided. Any damage to the tractor or to the attached implement can thus be reliably and efficiently avoided.

An appropriate technical design of a suitable device makes it possible to warn the driver of the tractor of an obstacle in good time on the basis of at least one of the above parameters. The driver then has the opportunity to remove the obstacle before the tractor or the attached implement drive over it. This makes it possible to significantly reduce the burden on the driver, since on the one hand the driver is supported in identifying obstacles, and on the other hand does not have to be concerned about the consequences of any damage.

The two parameters mentioned above are used in the method. Optionally, at least one more parameter or at least one more physical quantity is used. In particular, the above-mentioned classification parameter is used in one method step, and the above-mentioned work parameter is used in a subsequent method step. This supports efficient selection of those objects that, for the respective specific work operation, actually constitute an obstacle that should be removed or avoided.

Classification of the detected object is effected in that a classification parameter is a size of the object. The size may be defined, for example, on the basis of a detected volume or other suitable geometric-physical parameter. In this case, the size is detected with sufficient accuracy in a technically simple manner, in particular by a suitable optical detection unit (e.g., optical sensor, camera). In the case of classification on the basis of a size of the detected object, one or more size categories may be provided. The detected object is then assigned to the applicable size category. The individual size categories may be classified, or defined, as obstacle or non-obstacle, depending on the specific work operation or type of tractor or type of attached implement. A control unit may then decide whether the applicable size category, and thus the detected object, represents an obstacle during the current work operation.

A classification may also be used to decide whether the detected object represents an obstacle only for the attached implement or also already for the tractor.

As explained in the example above, an appropriately defined classification offers the possibility of adapting the method to differing work applications or tractors or attached implements in a technically simple manner.

The predefined work parameter is a working width in the transverse direction of the tractor. The working width depends on the width of the tractor or the width of the attached implement. It corresponds in particular to one of the two latter widths. Depending on whether the detected object is inside or outside of the working width, a suitable control unit can then decide whether or not it is an obstacle. The working width may be specified manually, for example. Alternatively, the working width is determined automatically in dependence on tractor-side settings or by identification of the attached implement.

Depending on the sensor used, a distance between the detected object and the tractor or the attached implement is also ascertained in the detection of an object. It can be ascertained, in combination with information on the current travel speed of the tractor, how long it will take for the tractor or the attached implement to reach the detected object. The method can thereby provide a further improved assistance function for the tractor driver.

In another embodiment, a warning signal is emitted when an object is identified as an obstacle. The driver is thus warned in an appropriate manner. This can be acoustically (e.g., warning tone) or visually (e.g., warning lamp). If a distance between the tractor and the object is also ascertained, the warning signal may also be output in differing intensity levels, depending on the distance ascertained in each case.

Also, the method is configured in such a manner that the travel speed of the tractor is altered automatically in the event of an object being identified as an obstacle. For example, this is effected by automatic intervention in an engine control unit or in the drive train of the tractor. For the driver, this provides an assistance function that reduces the travel speed or stops the tractor, in order not to drive over the obstacle.

In the event of an object being detected as an obstacle, in particular a position, or location, of the detected object is signaled. This signaling may be, for example, information or a representation on a screen, display, head-up display or the like, to warn the driver.

In another design, a suitable device for executing the method is used to observe a work area that has already been worked, or traversed, in order to determine whether an object or an obstacle is present there. This work area is in particular a work area to the rear along the direction of travel of the tractor. In this way, information can be obtained which, when appropriately signaled, is useful to the driver of the same tractor if the same work area is travelled over again. Furthermore, this information may also assist in subsequent work operations on the same work area with other tractors or other drivers.

A position, or location, of the detected object, in particular an object identified as an obstacle, is stored as retrievable position data. This allows a position, or location, of the detected object to be made available also to other drivers or other vehicles. For this purpose, the ascertained position data may be stored, for example, in appropriate database systems.

To execute the method, a suitable device is provided on the tractor. This device has, in particular, at least one detection unit that detects an object on a work area. The detection unit(s) has/have an optical detection device (e.g., a camera, mono or stereo camera, lidar sensor, other optical sensors) that observe a work area yet to be worked (e.g., in front of the tractor) or a work area that has already been worked (e.g., behind the tractor).

Furthermore, the above-mentioned device has a control unit that processes signals from the at least one detection unit. For this purpose, the control unit comprises, for example, a software for image processing. This software may be used to identify whether a detected object is inside or outside of a transverse travel region of the tractor or the attached implement.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
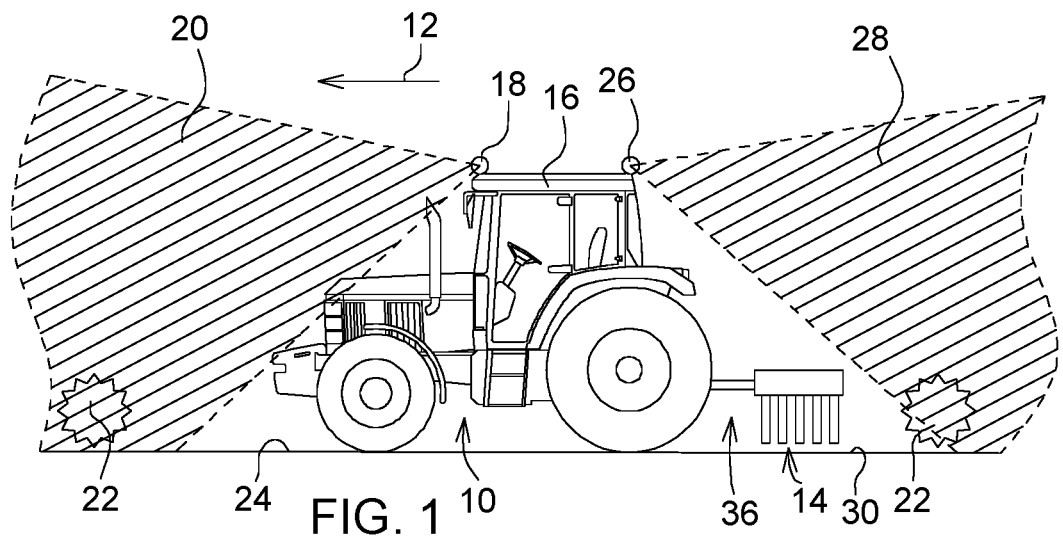
FIG. 1 is a schematic side view of a tractor/attached implement combination.

FIG. 1 shows a tractor 10, with an attached implement 14 (e.g., rotary harrow, seed drill) that is towed by it along a direction of travel 12. Arranged in a front region of a driver's cab 16 of the tractor 10 is a first detection unit 18 (e.g., camera, optical sensor). It detects, within a detection range 20, any objects 22 located on a work area 24 on which work is to be performed.

As shown in FIG. 1, arranged in a rear region of the driver's cab 16 is a second detection unit 26 (e.g., camera, optical sensor) that detects, within a detection range 28, any objects 22 located on a work area 30 that has already been worked.

Figure 2:
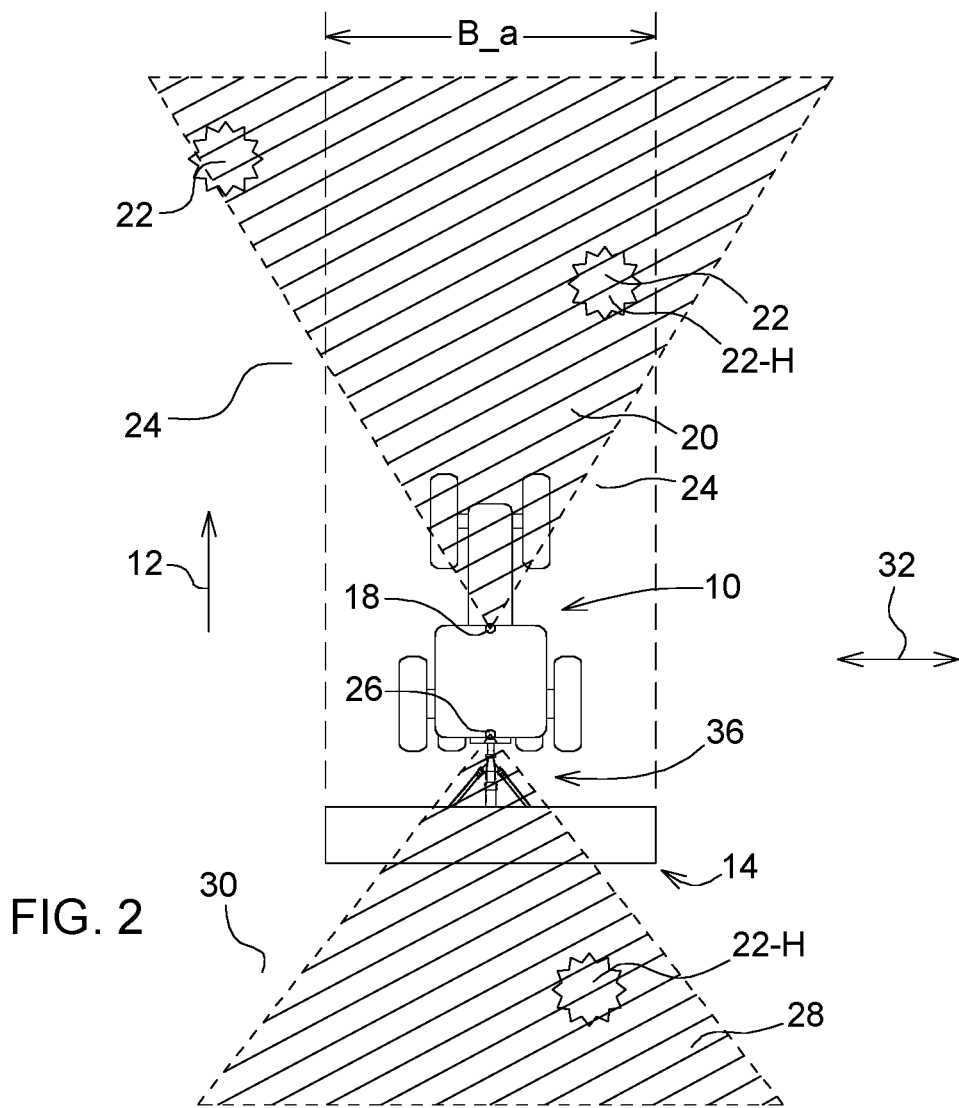
FIG. 2 is a schematic top view of the tractor/attached implement combination according to FIG. 1.

FIG. 2 shows a working width B_a in a transverse direction 32 of the tractor 10. The working width B_a serves as a work parameter AP. With this work parameter AP being taken into account, it is decided in the course of the method whether a detected object 22 in the work area 24 that is yet to be worked is actually an obstacle.

In the example shown in FIG. 2, the first detection unit 18 detects two objects 22 in the work area 24 on which work is to be performed. Of these, one object 22 is located within the working width B_a and, if at least one further condition is fulfilled (e.g., a certain minimum size of object 22), it can be identified as an obstacle 22-H. The other object 22 is located within the work area 24, but is outside of the working width B_a. It is therefore not classified, or identified, as a current obstacle.

The criteria for the classification of a detected object 22 as an obstacle 22-H may differ for, on the one hand, the work area 24 on which work is to be performed and, on the other hand, the work area 30 that has already been worked.

Figure 3:
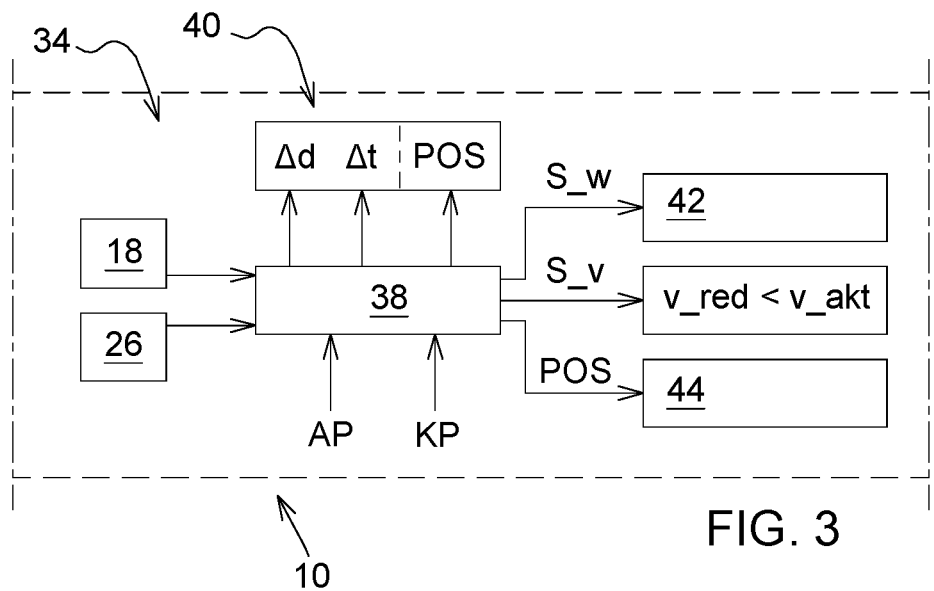
FIG. 3 is a schematic block-diagram type representation of a device for executing the method according to the present disclosure.

FIG. 3 shows a device 34, integrated on the tractor 10, for executing the method for identifying an obstacle 22-H during a work operation of the tractor/attached implement combination 36. The device 34 includes the two above-mentioned detection units 18, 26, and a control unit 38.

The control unit 38 receives the signals from the detection units 18, 26, for the purpose of image processing. In addition, the control unit 38 receives as input signals—automatically from a tractor-side or implement-side control system or manually—the values of a classification parameter KP (e.g., a volume-related size) of the object 22, and the values of the already mentioned work parameter AP.

The control unit 38 ascertains a distance Δd between the tractor 10 and a detected object 22. With the current travel speed of the tractor 10 being taken into account, there is also ascertained, from the distance Δd, a time period Δt upon expiry of which the tractor 10 would encounter the object 22, or obstacle 22-H.

The values of the distance Δd, the time period Δt and position data POS of the detected object 22, or at least of the object 22 identified as obstacle 22-H, are presented to the driver of tractor 10 on a display unit 40 in a suitable manner. The display unit 40 may also have subunits that are physically separate from each other, e.g., a separate display element for the presentation of the position data POS.

In the event of an object 22 being identified, or classified, as obstacle 22-H, the control unit 38 sends warning signals S_w to an optical or acoustic warning unit 42 to warn the driver. In addition, the control unit 38 intervenes, via emitted control signals S_v, in an engine control unit or in the drive train of the tractor 10, in such a manner that its current travel speed v_akt is reduced to a lower travel speed v_red, in particular is reduced to 0. In addition, the control unit 38 causes the position data POS to be stored in a memory unit 44. The latter may be integrated on the tractor 10 or, alternatively, arranged away from the vehicle (e.g., in a suitable database system). This makes it possible for these stored data to be accessed in a technically simple manner by authorized third parties, e.g., other drivers with their own tractors. The stored position data POS may relate to objects 22 of the work area 24 on which work is to be performed or to objects 22 on the work area 30 that has already been worked.

Figure 4:
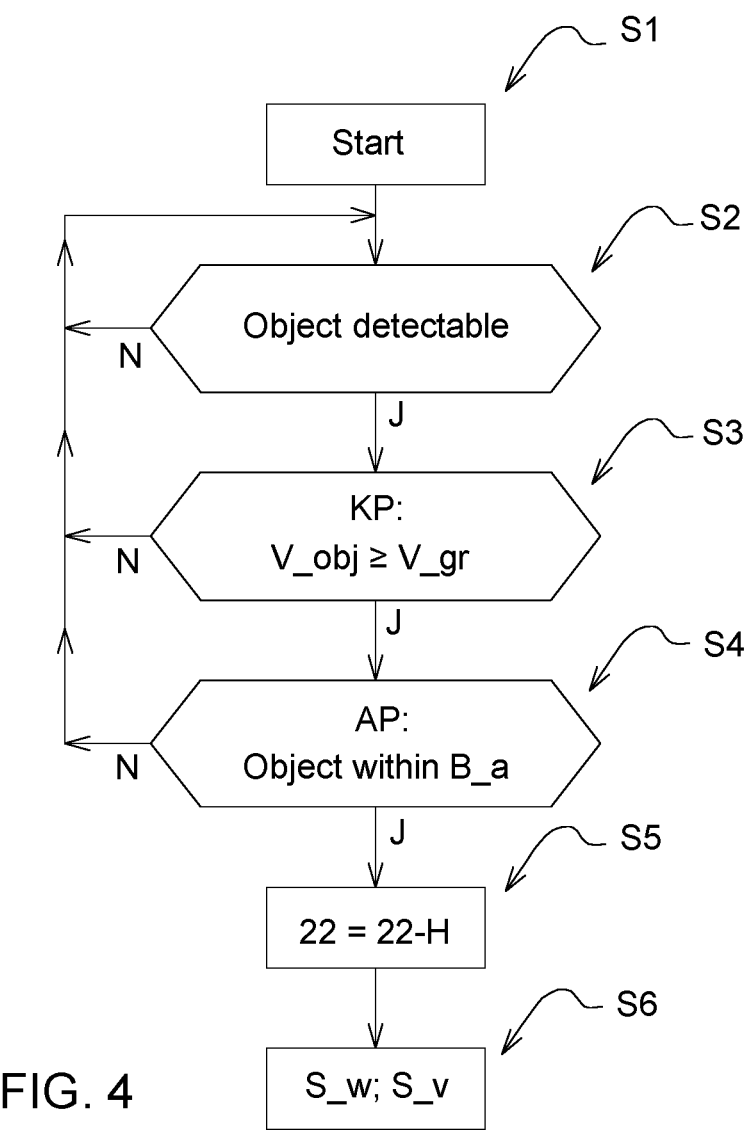
FIG. 4 is a flow diagram with method steps of the method according to the present disclosure.

A variant of the method sequence is described with reference to FIG. 4. After an initialization step S1, the signals from the detection unit 18 are checked in the control unit 38 to determine whether there is an object 22 located on the work area 24 (step S2). This step S2 is performed until an object 22 has been detected. Then, in step S3, it is checked, on the basis of the predefined classification parameter KP, whether the detected volume V_obj is at least as great as a predefined volume limit value V_gr. Alternatively, another suitable physical quantity may be used instead of the volume for a size classification of the detected objects 22.

If the control unit 38 determines that the detected volume V_obj is less than the predefined volume limit value V_gr, the procedure returns to step S2, and the control unit 38 does not emit control signals S_w, S_v. If, however, it is determined in step S3 that the detected volume V_obj is at least as great as the volume limit value V_gr, it is checked in a further step S4 whether the detected object 22 is within the working width B_a. If not, the procedure returns to step S2, and the control unit 38 does not emit control signals S_w, S_v. If, on the other hand, the object 22 is located within the working width B_a, this object 22 is identified as an obstacle 22-H (step S5). The control unit 38 then causes the control signals S_w and S_v to be emitted (step S6). Optionally, at this point in time the control unit 38 may also cause the position data POS of this detected obstacle 22-H to be stored. After step S6 has been completed, the method sequence may be terminated or the system returns automatically to step S2 in order to detect further objects 22.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for identifying an obstacle during a plurality of work operations of a tractor and rear attached implement combination, comprising:
   detecting via a first optical sensor a first object located in a work area yet to be worked in front of the tractor and rear attached implement combination;
   detecting via a second optical sensor a second object located in a work area already worked behind the tractor and rear attached implement combination;
   identifying via a control unit, including a processor and memory, the first object as a first obstacle based on (1) a predefined classification parameter including a first applicable size category determined based on a size of the first object and a type of a rear attached implement of the tractor and rear attached implement combination, and (2) a predefined work parameter of the rear attached implement including a working width of the rear attached implement; wherein the plurality of work operations includes a planting and a pre-planting operation; and wherein the type of rear attached implement defines whether the rear attached implement is configured to perform the planting work operation or the pre-planting work operation;
   identifying via the control unit the second object as a second obstacle based on (1) a predefined classification parameter including a second applicable size category determined based on the size of the second object and the type of the rear attached implement, and (2) the predefined work parameter of the rear attached implement including the working width of the rear attached implement, wherein criteria for classification of the first object as the first obstacle in the work area yet to be worked differs from criteria for classification of the second object as the second obstacle in the work area that has already been worked;
   determining via the control unit a distance between the tractor and the first obstacle;
   determining via the control unit a time period when the tractor would encounter the first obstacle;
   sending via the control unit a warning signal configured to be output at a plurality of differing intensity levels depending on the distance between the tractor and the first obstacle;
   reducing via the control unit a speed of the tractor without stopping the tractor when the first obstacle is in the work area yet to be worked in front of the tractor;
   displaying via a display the distance, the time period, and a position of the first obstacle; and
   storing the position of the first obstacle as retrievable position data in a database accessible by other vehicles.

2. The method of claim 1, wherein the control unit is configured to identify the first object as the first obstacle for only the rear attached implement, and the control unit is configured to identify the second object as the second obstacle for the rear attached implement and for the tractor.

3. The method of claim 1, wherein the control unit is configured to identify the first object as the first obstacle for the rear attached implement and for the tractor, and the control unit is configured to identify the second object as the second obstacle for the rear attached implement and for the tractor.

4. The method of claim 1, wherein the control unit is configured to identify the first object as the first obstacle for only the rear attached implement, and the control unit is configured to identify the second object as the second obstacle for only the rear attached implement.

5. The method of claim 1, wherein the size of the first object includes a detected volume, and the first applicable size category includes a predetermined predefined volume limit value.

6. The method of claim 1, wherein the type of the rear attached implement is a rotary harrow.

7. The method of claim 1, wherein the type of the rear attached implement is a seed drill.

8. The method of claim 1, wherein the type of the rear attached implement included in the tractor and rear attached implement combination differs from the working width of the rear attached implement.

9. A tractor and rear attached implement combination for performing a plurality of work operations, comprising:
   a first optical sensor configured to detect a first object located in a work area yet to be worked in front of the tractor and rear attached implement combination;
   a second optical sensor configured to detect a second object located in a work area already worked behind the tractor and rear attached implement combination;
   a control unit, including a processor and memory, configured to identify the first object as a first obstacle based on (1) a predefined classification parameter including a first applicable size category determined based on a size of the first object and a type of a rear attached implement of the tractor and rear attached implement combination, and (2) a predefined work parameter of the rear attached implement including a working width of the rear attached implement; wherein the plurality of work operations includes a planting and a pre-planting operation; and wherein the type of rear attached implement defines whether the rear attached implement is configured to perform the planting work operation or the pre-planting work operation;

the control unit configured to identify the second object as a second obstacle based on (1) a predefined classification parameter including a second applicable size category determined based on the size of the second object and the type of the rear attached implement, and (2) the predefined work parameter of the rear attached implement including the working width of the rear attached implement, wherein criteria for classification of the first object as the first obstacle in the work area yet to be worked differs from criteria for classification of the second object as the second obstacle in the work area that has already been worked;

the control unit configured to determine a distance between the tractor and the first obstacle;

the control unit configured to determine a time period when the tractor would encounter the first obstacle;

the control unit configured to send a warning signal configured to be output at a plurality of differing intensity levels depending on the distance between the tractor and the first obstacle;

the control unit configured to reduce a speed of the tractor without stopping the tractor when the first obstacle is in the work area yet to be worked in front of the tractor;

a display configured to present the distance, the time period, a position of the first obstacle, and a position of the second obstacle; and a database configured to store the position of the first obstacle and the position of the second obstacle as retrievable position data accessible by other vehicles.

10. The tractor and rear attached implement combination of claim 9, wherein the control unit is configured to identify the first object as the first obstacle for only the rear attached implement, and the control unit is configured to identify the second object as the second obstacle for the rear attached implement and for the tractor.

11. The tractor and rear attached implement combination of claim 9, wherein the control unit is configured to identify the first object as the first obstacle for the rear attached implement and the tractor, and the control unit is configured to identify the second object as the second obstacle for the rear attached implement and the tractor.

12. The tractor and rear attached implement combination of claim 9, wherein the control unit is configured to identify the first object as the first obstacle for only the rear attached implement, and the control unit is configured to identify the second object as the second obstacle for only the rear attached implement.

13. The tractor and rear attached implement combination of claim 9, wherein the size of the first object includes a detected volume, and the first applicable size category includes a predetermined predefined volume limit value.

14. The tractor and rear attached implement combination of claim 9, wherein the type of the rear attached implement is a rotary harrow.

15. The tractor and rear attached implement combination of claim 9, wherein the type of the rear attached implement is a seed drill.

16. The tractor and rear attached implement combination of claim 9, wherein the type of the rear attached implement included in the tractor and rear attached implement combination differs from the working width of the rear attached implement.

17. A method for identifying an obstacle during a plurality of work operations of a tractor and rear attached implement combination, comprising:

detecting via an optical sensor an object located in a work area yet to be worked in front of the tractor and rear attached implement combination;

identifying via a control unit, including a processor and memory, the object as an obstacle based on (1) a predefined classification parameter including an applicable size category determined based on a size of the object and a type of a rear attached implement of the tractor and rear attached implement combination, and (2) a predefined work parameter of the rear attached implement including a working width of the rear attached implement; wherein the plurality of work operations includes a planting and a pre-planting operation; and wherein the type of the rear attached implement defines whether the rear attached implement is configured to perform the planting work operation or the pre-planting work operation; and reducing via the control unit a speed of the tractor and rear attached implement combination when the obstacle is in the work area yet to be worked in front of the tractor and rear attached implement combination.

* * * * *